(12) United States Patent
Han et al.

(10) Patent No.: US 9,229,676 B2
(45) Date of Patent: Jan. 5, 2016

(54) DISPLAY DEVICE AND DISPLAY METHOD THEREOF

(75) Inventors: Shuang Han, Beijing (CN); Weiqiang Fang, Beijing (CN)

(73) Assignees: BEIJING LENOVO SOFTWARE Ltd., Beijing (CN); LENOVO (BEIJING) LIMITED, Beijing (CN)

( * ) Notice: Subject to any disclaimer, the term of this patent is extended or adjusted under 35 U.S.C. 154(b) by 657 days.

(21) Appl. No.: 13/129,048

(22) PCT Filed: Oct. 27, 2010

(86) PCT No.: PCT/CN2010/001709
§ 371 (c)(1),
(2), (4) Date: May 12, 2011

(87) PCT Pub. No.: WO2011/054175
PCT Pub. Date: May 12, 2011

(65) Prior Publication Data
US 2011/0211118 A1    Sep. 1, 2011

(30) Foreign Application Priority Data

Nov. 4, 2009    (CN) .......................... 2009 1 0235999

(51) Int. Cl.
*G06F 3/14*    (2006.01)
*H04N 5/44*    (2011.01)
(Continued)

(52) U.S. Cl.
CPC ............ *G06F 3/1431* (2013.01); *H04N 5/4401* (2013.01); *H04N 5/44591* (2013.01); *H04N 21/4122* (2013.01); *H04N 21/4316* (2013.01); *H04N 21/43632* (2013.01)

(58) Field of Classification Search
CPC .................................................... G06F 3/1431
USPC ........... 345/3.1, 4, 522, 691; 715/744; 725/75
See application file for complete search history.

(56) References Cited

U.S. PATENT DOCUMENTS 7,161,632 B2    1/2007    Sudo
7,277,104 B2 *  10/2007   Dickens et al. ............... 345/691
(Continued)

FOREIGN PATENT DOCUMENTS

CN    1484918 A    3/2004
CN    1622476 A    6/2005
(Continued)

*Primary Examiner* — Fred Tzeng

(57) ABSTRACT

A display device and display method thereof is provided. The display device comprises: a Micro Control Unit (MCU) for obtaining display control information for at least two sub-screens, updating display data format information for the display device based on the display control information, and transmitting the updated display data format information to a display adaptor of an intelligent device connected to the display device; a video interface supporting multi-channel signal transmission, for receiving video signals each corresponding to one of the at least two sub-screens, the video signals being output by the display adapter based on the updated display data format formation; and a display information processing chip for obtaining the video signals and the display control information for the at least two sub-screens received by the MCU, and outputting the video signals onto the respective sub-screens on the display panel based on the display control information for the sub-screens. With the present invention, it is possible to achieve a split-screen display on a single display device based on one video data line.

12 Claims, 4 Drawing Sheets

(51) Int. Cl.
*H04N 5/445* (2011.01)
*H04N 21/41* (2011.01)
*H04N 21/431* (2011.01)
*H04N 21/4363* (2011.01)

(56) References Cited

U.S. PATENT DOCUMENTS

| | | |
|---|---|---|
| 7,369,823 B2 | 5/2008 | Oiwa |
| 7,561,116 B2 | 7/2009 | Westerinen et al. |
| 7,900,141 B2 | 3/2011 | Kang |
| 8,115,700 B2 * | 2/2012 | Schlottmann et al. ............. 345/4 |
| 2007/0250867 A1* | 10/2007 | Kuwabara et al. ............... 725/75 |
| 2009/0059073 A1 | 3/2009 | Cho et al. |
| 2011/0234605 A1* | 9/2011 | Smith et al. ................... 345/522 |
| 2012/0284631 A1* | 11/2012 | Lancioni et al. .............. 715/744 |

FOREIGN PATENT DOCUMENTS

| | | |
|---|---|---|
| CN | 1980443 A | 6/2007 |
| CN | 101377920 A | 3/2009 |

* cited by examiner

DISPLAY DEVICE AND DISPLAY METHOD THEREOF

FIELD OF THE INVENTION

The invention relates to computer technology, and more particularly, to a display device and display method thereof.

BACKGROUND OF THE INVENTION

With the development of the display technology, the dimension of display screen becomes increasingly larger. In addition to the capability of displaying one video signal with a large screen display, it is desired to show a plurality of video signals on such display simultaneously, which is also referred to as split-screen display.

Currently, the standardized video interfaces include Video Graphic Array (VGA), Digital Visual Interface (DVI), High Definition Multimedia (HDMI) and DisplayPort (DP, a digital display interface). Among these interfaces, the VGA, DVI and HDMI can only support one single display device on each data line, while the DP Specification 1.2 can support a multi-screen serial display function.

As shown in FIG. 1, a notebook computer, as a video signal source, is connected to external displays A, B, C and D. As shown, the display A is connected to the notebook computer directly and the displays B, C and D are connected in series to the display A. In this way, each display can be independently controlled to display different contents. These displays may be different from each other in terms of resolution and size. The DP 1.2 can support a bandwidth up to 5.4 Gbps per signal pair. That is, all these displays A, B, C and D can achieve a 1920*1080 full definition display at the same time and the bandwidth between the display A and the notebook computer host is the summed bandwidths occupied by the four displays, such that a display effect equivalent to parallel arrangement is possible.

FIG. 2 is a schematic diagram showing a parallel connection between several displays. As shown, a host Z is connected to displays E, F and G, respectively. The displays E, F and G are connected to the host Z via their respective video interfaces. For example, the display E can be connected to the host Z via interface 1, the display F can be connected to the host Z via interface 2, and the display G can be connected to the host Z via interface 3. The interfaces 1, 2 and 3 can be video interfaces or other type of interfaces. A host can be connected with several displays for improved efficiency. As an example, one display can be used for word processing, one or more displays for dynamical displaying information on stock market, and one display for instant messaging (such as MSN and QQ) or SKYPE voice. These displays will not interfere with each other.

However, both solutions suffer from the following disadvantages in common: an excessive number of displays occupy much space and have high costs. For example, some conventional applications such as web page browsing, office applications and games typically do not need high definition resolution. For such applications, a resolution of 1280*1024 will be sufficient, which is also a resolution used by most of applications. On the other hand, an instant messaging application such as MSN requires a very small screen space for which a resolution of 300*500 will be enough.

In implementation of the present invention, the inventors have realized at least the following problem in the prior art. In the prior art, it is not possible to perform a split-screen display in a single display device in such a manner that each screen can achieve the same function as one of the multiple displays as described above with respect to FIGS. 1 and 2.

SUMMARY OF THE INVENTION

An object of the present invention is to provide a display device and display method thereof, in which each sub-screen can achieve the function of one of a plurality of conventional display devices.

In order to achieve the above object, the embodiments of the present invention provide the following solutions.

In one aspect, a display device having a display panel is provided, which comprises:

a Micro Control Unit (MCU) for obtaining display control information for at least two sub-screens, updating display data format information for the display device based on the display control information, and transmitting the updated display data format information to a display adaptor of an intelligent device connected to the display device;

a video interface supporting multi-channel signal transmission, for receiving video signals each corresponding to one of the at least two sub-screens, the video signals being output by the display adapter based on the updated display data format information; and a display information processing chip for obtaining the video signals and the display control information for the at least two sub-screens received by the MCU, and outputting the video signals onto the respective sub-screens on the display panel based on the display control information for the at least two sub-screens.

Preferably, the video interface supporting multi-channel signal transmission is a digital display interface, DisplayPort, which is directly connected to the display adapter.

Preferably, the video interface supporting multi-channel signal transmission is a USB interface comprising a USB hub and at least two USB modules, wherein the USB hub is connected to the display adapter, the at least two USB modules are each connected to the USB hub, and each of the at least two USB modules corresponds to one of the at least two sub-screens; and the at least two USB modules are each connected to the MCU and to the display information processing chip and configured for transmitting the display data format information updated by the MCU to the display adapter via the USB hub, receiving the video signals output by the display adapter based on the updated display data format information and outputting the video signals to the display information processing chip.

Preferably, each of the at least two USB modules is configured for:

turning off a connection port to the display information processing chip based on the display data format information updated by the MCU; or transmitting the updated display data format information to the USB hub which turns off its connection port to the USB module based on the display data format information updated by the MCU.

Preferably, each of the USB modules comprises:

a USB decoder for decoding a video signal received from the display adapter into a signal in DVI, VGA or HDMI format;

a flash memory for storing the video signal decoded by the USB decoder; and a Double Data Rate (DDR) memory for supporting the decoding by the USB decoder.

Preferably, the display device further comprises:

a control key for providing split-screen options, obtaining display control information for the at least two sub-screens as selected by the user from the split-screen options, and transmitting the display control information for the at least two sub-screens to the MCU.

Preferably, the display control information for the sub-screens comprises the number of sub-screens and information on display location of each of the sub-screens on the display panel.

Preferably, the display control information for the sub-screens further comprises a contrast, a color temperature and/or rotation control information for each of the sub-screens.

In another aspect, a display method for a display device is provided, which comprises:

obtaining display control information for at least two sub-screens;

updating display data format information for the display device based on the display control information for the at least two sub-screens, and transmitting the updated display data format information to a display adaptor of an intelligent device connected to the display device;

receiving video signals each corresponding to one of the at least two sub-screens, the video signals being output by the display adapter based on the updated display data format formation; and outputting the video signals onto the respective sub-screens on a display panel based on the display control information for the at least two sub-screens.

Preferably, the display control information for the sub-screens comprises the number of sub-screens and information on display location of each of the sub-screens on the display panel.

Preferably, the step of outputting the video signals onto the respective sub-screens on a display panel based on the display control information for the at least two sub-screens comprises:

calculating, based on the number of the at least two sub-screens, the resolution of a sub-screen on which a video signal is to be displayed and outputting the video signal onto the sub-screen on the display panel of the display device based on the resolution of the sub-screen and the information on the display location of the sub-screen on the display panel.

The embodiments of the present invention have the following advantageous effects. By obtaining the display control information for at least two sub-screens, the MCU of the display device can update its display data format information according to the display control information for the at least two sub-screens. Then, by interacting with the display adapter of the host, the MCU can output the video signals output from the display adapter onto the respective activated sub-screens according to the updated display data format information, so as to achieve split-screen display on one display device. Herein, each sub-screen functions as a complete and independent display, such that the actual user requirement for displaying a plurality of sub-screens on a large screen display can be satisfied.

DETAILED DESCRIPTION OF PREFERRED EMBODIMENTS

In the following, the present invention will be described in detail with reference to the embodiments and figures, such that the problem to be solved, the solutions and the advantages of the present invention will be more apparent.

In the prior art, it is not possible to achieve split-screen display in a single display device. In view of this problem, the embodiments of the present invention provide a display device and display method thereof, in which each sub-screen can achieve the function of one of a plurality of conventional display devices.

Figure 1:
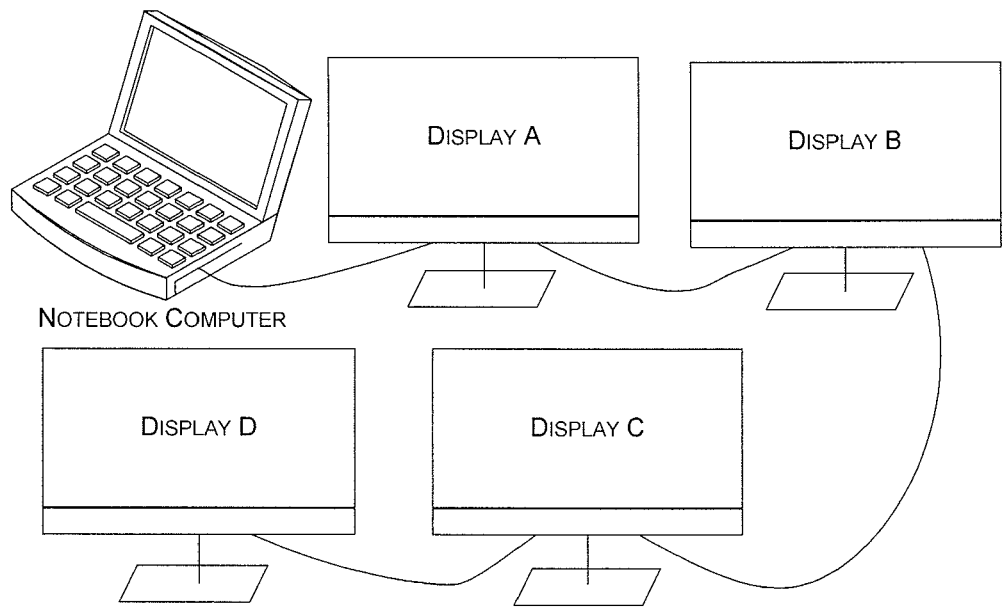
FIG. 1 is a schematic diagram showing the connection relationship among a number of displays connected in series based on the DP interface.
Figure 2:
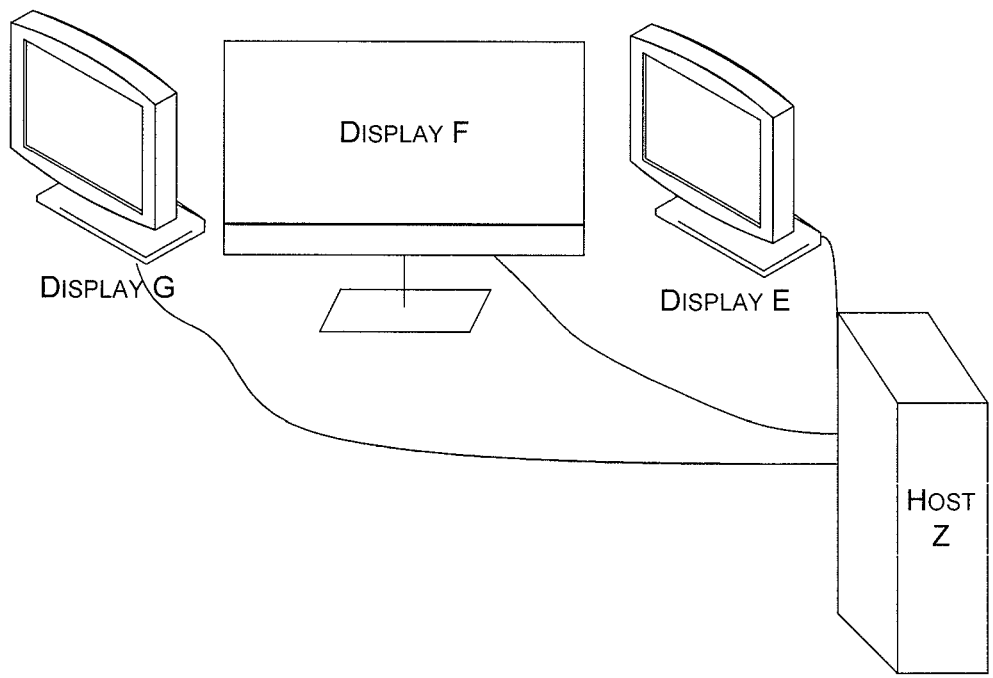
FIG. 2 is a schematic diagram showing the connection relationship among a number of displays connected in parallel by a number of video signal lines according to the prior art.
Figure 3:
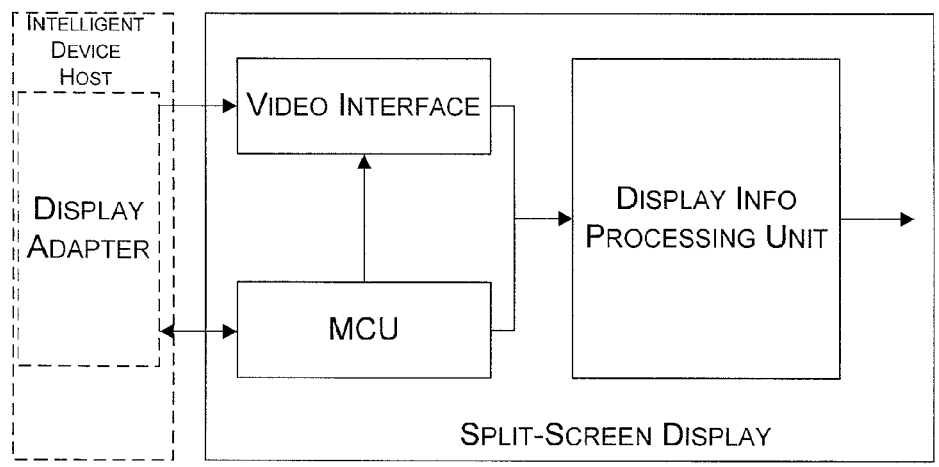
FIG. 3 is a schematic diagram showing the structure of the display device according to the present invention and the connection relationship between the display device and an intelligent device host.

As shown in FIG. 3, the display device according to an embodiment of the present invention is a split-screen display device having a display panel. The display panel of the split-screen display device has a plurality of display areas each being referred to as a sub-screen. The display device comprises a Micro Control Unit (MCU) for obtaining display control information for at least two sub-screens, updating display data format information for the display device based on the display control information, and transmitting the updated display data format information to a display adaptor of an intelligent device connected to the display device. Preferably, the intelligent device may be a computer host and the display adapter may be a graphic adapter of the host. Of course, the intelligent device may be any device capable of processing multimedia information and having a display adapter and a video interface. The display adapter is used to convert data signals of the intelligent device into graphical information the display device is able to display, such that the graphical information can be displayed on the display device.

The display device further comprises a video interface supporting multi-channel signal transmission, which is configured for receiving video signals each corresponding to one of the at least two sub-screens, the video signals being output by the display adapter based on the updated display data format formation.

The display device further comprises a display information processing chip for obtaining the video signals and the display control information for the at least two sub-screens received by the MCU, and outputting the video signals onto the respective sub-screens on the display panel based on the display control information for the at least two sub-screens.

Figure 7:
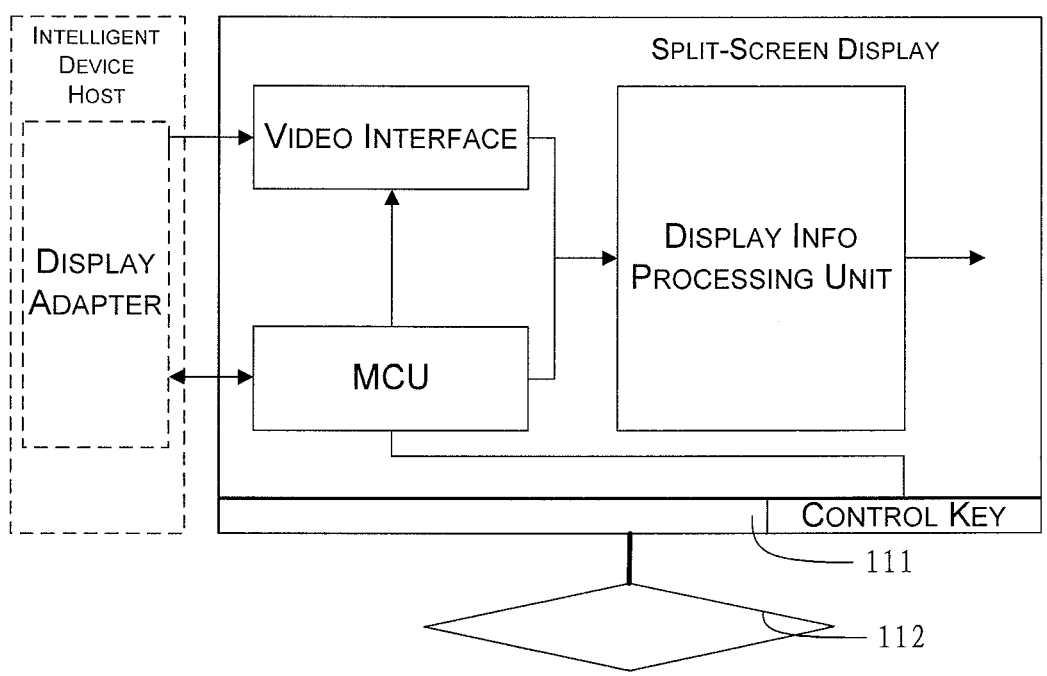
FIG. 7 is a schematic diagram showing the structure of the display device as shown in FIG. 3, in which a control key is provided on the frame around the display panel of the display device.

Preferably, the display control information for the at least two sub-screens as described above can be generated in one of the following manners:

1) A split-screen option can be provided using a control key on the display device. In this case, the user can select from the split-screen option to activate at least two sub-screens and generate the display control information for the at least two sub-screens. Herein, the control key can be provided on the frame around the display panel of the display device, as shown in FIG. 7.
2) The intelligent device host can provide options for controlling the activation or deactivation of the sub-screens of the display device and generating the display control information for at least two sub-screens which are selected to be activated.
3) In the display device, at least two sub-screens have been activated by default. The display control information for the at least two sub-screens can be stored in the MCU in advance.

Herein, the display control information for the sub-screens comprises the number of sub-screens and information on display location of each of the sub-screens on the display panel. In this case, according to the number of sub-screens and information on display location of each of the sub-screens, the display information processing chip can output a video signal to be displayed on a sub-screen to the sub-screen for display.

Figure 4:
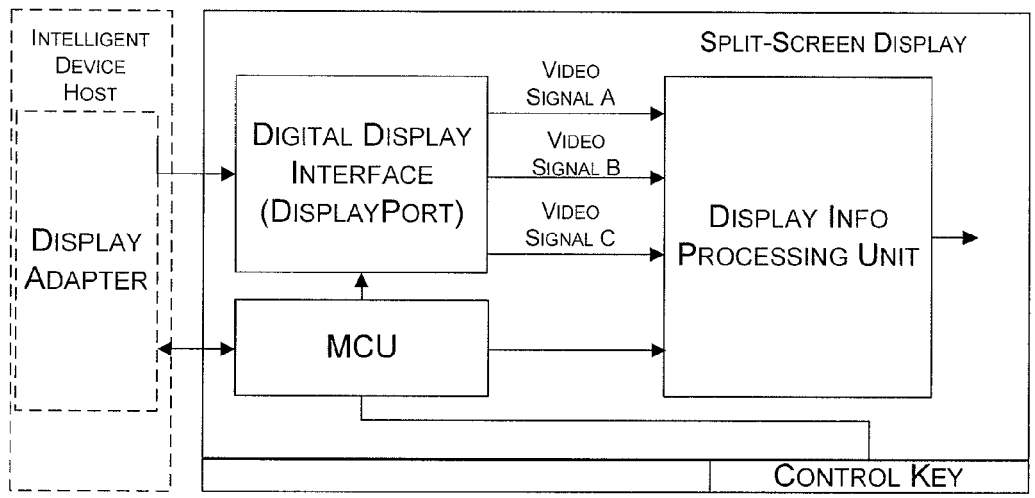
FIG. 4 is a schematic diagram showing the structure of the display device as shown in FIG. 3 and the connection relationship between the display device and the intelligent device host when the video interface of the display device is a DisplayPort interface.

As illustrated in FIG. 4, the video interface supporting multi-channel signal transmission, as mentioned above, is a digital display interface, DisplayPort, which is directly connected to the display adapter. In this case, there is also a DisplayPort transmission channel between the MCU and the display adapter of the intelligent device, such as an AUX channel, for transmitting to the host the updated display data format information. The display data format information may be for example Extended Display Identification Data (EDID) information, which is a standard data format containing parameters related to the monitor and its performance, such as vendor information, maximum image size, color setting, manufacturer's default setting, limit on frequency range and character string representing display name and serial number. The display adapter may update corresponding hardware list information according to the EDID information, such as the number of display devices in communication with the display adapter.

In the following, a process for achieving split-screen display on a single display device when the video interface supporting multi-channel signal transmission is a DisplayPort interface will be explained with reference to FIG. 8.

The intelligent device here may be a notebook computer whose built-in graphic adapter may function as the display adapter as described above. The display device is connected to the notebook computer. In this example, the display device is a full definition display having a resolution of 1920*1080 and the resolutions of its three preset sub-screens are assumed to be 1280*1080 for sub-screen 2, 640*480 for sub-screen 3 and 640*600 for sub-screen 4. Herein, any two out of the three sub-screens can be combined. For example, the sub-screens 3 and 4 can be combined to form a sub-screen 5 having a resolution of 640*1080.

1) From the selection made by the user through the control key (a key on the display device), the MCU obtains the number of sub-screens to be displayed and the display location of each sub-screen on the display panel of the display device.

2) After receiving the information on the number of sub-screens and their locations as selected through the control key, the MCU updates the EDID information and informs the updated EDID information to the graphic adapter of the notebook computer via the AUX channel in the DisplayPort, indicating the changes in the number of sub-screens and their respective resolutions.

3) The notebook computer host updates its hardware list according to the changes in configuration of sub-screens. In this case, the video signals output on the signal line by the graphic adapter will change accordingly, so as to output the video signals corresponding to the above sub-screens.

4) The MCU informs the updated EDID information to the DisplayPort interface (such as a receiver of the DisplayPort). The DP receiver can then decode the received video data based on the EDID configuration information, so as to output to the display information processing chip three sets of video data (video data A, video data B and video data C) each corresponding to the image of one of the three sub-screens. Herein, the display information processing chip may be a Scalar chip.

Figure 8:
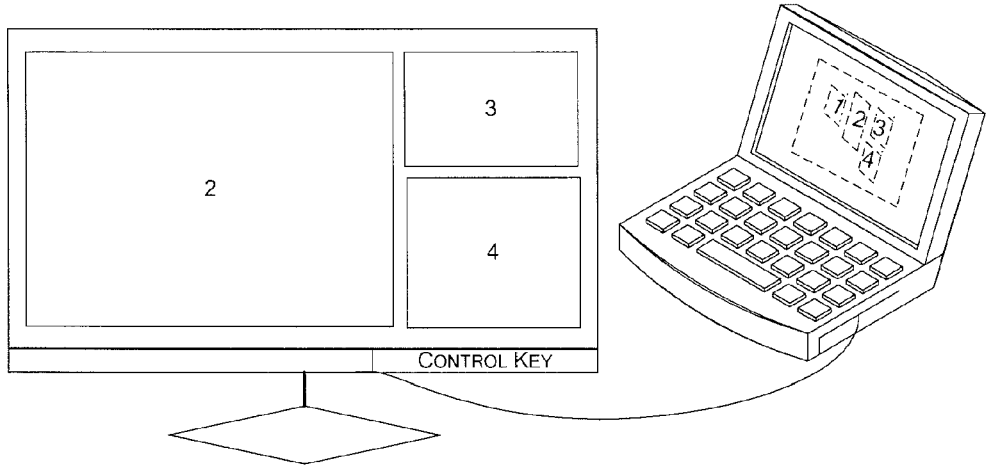
FIG. 8 is a diagram showing the effect of split-screen display after the display device as shown in FIGS. 3-7 is connected to the intelligent device host.

4.1) In order to properly display the three sub-screens 2, 3 and 4 (each corresponding to a conventional display device), as shown in FIG. 8, the host and the DP receiver are informed by the EDID information that there are three sub-screens to be connected, as well as the resolution of each of the sub-screens. If the sub-screen 3 is deactivated (for example by the user through the control key), the MCU updates the EDID information indicating the sub-screen 3 is disconnected. In this case, the host can only see two sub-screens, i.e., sub-screens 2 and 4. However, the DP receiver can normally decode and output the video data A and C for the two remaining sub-screens, while the port B outputs only black pixels, i.e., to form a black picture of a resolution of 640*480 as preset.

4.2) If only two sub-screens, i.e., the sub-screen 2 and the sub-screen 5 which is a combination of the sub-screens 3 and 4, are to be activated, the MCU will update the EDID information in a similar manner and inform the host and the DP decoder that the previous displays 3 and 4 are disconnected and a display 5 (the sub-screen 5) having a resolution of 640*1080 is newly connected. In this case, the DP decoder can output the data A for the sub-screen 2 and the data B for the sub-screen 5, with the other port C outputting a null signal.

4.3) If only one sub-screen is to be activated, the MCU will update the EDID information and inform the host and the DP decoder that the previous displays 2, 3 and 4 are disconnected and a display 5 having a resolution of 1920*1080 is newly connected. In this case, the DP decoder only outputs video data via the port A, with the other ports B and C being null.

The most important information transmitted from the MCU to the Scalar chip is the location of each sub-screen.

The data processing inside the Scalar chip is as follows.

In the above case 4.1), the Scalar chip first calculates the three sets of video data A, B and C, respectively (if the resolutions set by the user at the host side exactly are equal to the resolutions preset for the sub-screens, no calculation is needed; otherwise the video data will be displayed according to the preset resolutions of the sub-screens), combines the sub-screens into a large screen having the same resolution of 1920*1080 as the original display device based no the location information, and outputs the video data to the liquid crystal screen (i.e., the display panel of the display device).

In the above case 4.2), the data set containing null signal will be ignored and the other two sets of data will be processed in the same way as described in 4.1).

In the above case 4.3), the Scalar chip only processes the data for the port A.

Finally, the Scalar chip outputs the complete image to the liquid crystal screen.

Since all the sub-screens share the same background light source, they have the same luminance. However, their respective contrasts and color temperatures can be separately controlled using a related menu which is popped up by operating the control key. In this case, the display control information for the sub-screens further comprises a contrast, a color temperature and/or rotation control information for each of the sub-screens. In this way, the contrast of a sub-screen can be adjusted independently based on the contrast control information for the sub-screen. Likewise, the color temperature and the rotation of a sub-screen can also be independently controlled.

During the process carried out by the Scalar chip, it is also possible to rotate the picture of a particular sub-screen.

In the above process, when the MCU detects the change in the number of activated sub-screen(s) and updates the EDID information, the EDID information will be transmitted to the host. Thus, in the desktop properties of the host, there may be three displays having different resolutions and their respective resolutions can be adjusted separately. FIG. 8 shows a picture displayed in the notebook computer, in which the screen 1 represents the screen of the notebook computer itself, and the sub-screens 2, 3 and 4 represent a plurality of sub-screens in an external display device.

To sum up, in the above solution, the display device connected to the host via a DisplayPort interface is split into three sub-screens labeled as 2, 3 and 4, respectively. The user may select, by using a control key on the display device, to activate/deactivate each of the sub-screens separately, combine the sub-screens 3 and 4 into one screen (in this case, in the host properties, there are only two additional screens labeled as 2 and 3, respectively and the screen labeled as 3 has a resolution equal to the summed resolutions of the screens originally labeled as 3 and 4, respectively), or combine all the three sub-screens into a conventional display device. As an alternative, in the case of three sub-screens, the locations of the sub-screens 3 and 4 may be interchanged or arranged as a whole on the leftmost side of the display screen of the display device. Also, in the case of two sub-screens, the locations of the new sub-screen 3 and the sub-screen 2 may be interchanged.

Figure 5:
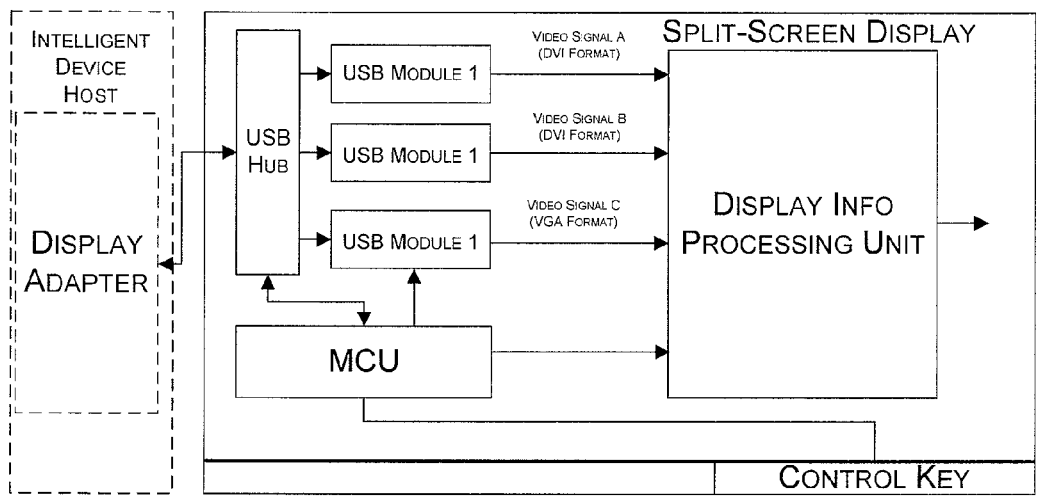
FIG. 5 is a schematic diagram showing the structure of the display device as shown in FIG. 3 when the video interface of the display device is a USB interface.

Alternatively, as also shown in FIG. 5, the video interface supporting multi-channel signal transmission as described above may be a Universal Serial Bus (USB) interface comprising a USB hub and at least two USB modules, wherein
the USB hub is connected to the display adapter, the at least two USB modules are each connected to the USB hub, and each of the at least two USB modules corresponds to one of the at least two sub-screens; and
the at least two USB modules are each connected to the MCU and to the display information processing chip and configured for transmitting the display data format information updated by the MCU to the display adapter via the USB hub, receiving the video signals output by the display adapter based on the updated display data format information and outputting the video signals to the display information processing chip.

Figure 6:
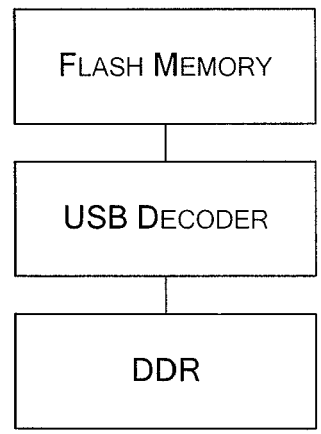
FIG. 6 is a schematic diagram showing the specific structure of the USB module as shown in FIG. 5.

As shown in FIG. 6, each of the USB modules comprises: a USB decoder for decoding a video signal received from the display adapter into a signal in DVI, VGA or HDMI format; a flash memory for storing the video signal decoded by the USB decoder; and a Double Data Rate (DDR) memory for supporting the decoding by the USB decoder.

Herein, at the USB interface, there are two approaches for outputting the video signals to the display information processing chip based on the number of the activated sub-screens.

1) According to the display data format information updated by the MCU, the at least two USB modules turn off its connection port to the display information processing chip. For example, if the user deactivates one of the sub-screens, the MCU will update the display data format information (EDID information, for example) to indicate which sub-screen has been deactivated. Then, the USB modules can turn off the output port corresponding to the deactivated sub-screen. In this way, the area in the display panel of the display device corresponding to the sub-screen becomes a black screen. Meanwhile, in the desktop property information of the host side, the information of the deactivated sub-screen remains to be displayed since the host is still outputting the video signal associated with the sub-screen to the USB hub as previously, except for that the video signal is cut off at the USB modules.

2) The at least two USB modules transmit the updated display data format information to the USB hub. The USB hub then turns off its connection port to a corresponding USB module according to the display data format information updated by the MCU. In this case, the area in the display panel of the display device corresponding to the sub-screen becomes a black screen. Meanwhile, in the desktop property information of the host side, the information of the deactivated sub-screen will be deleted or become "disconnected". This is because, if the USB hub turns off its output port to the USB module corresponding to the deactivated sub-screen, the host will not output video data and the host can detect the deactivation of the sub-screen.

In the following, a process for achieving split-screen display on a single display device when the video interface supporting multi-channel signal transmission is a USB interface will be explained with reference to FIG. 8.

1) According to the sub-screens the user selects to activate through the control key (a key on the display device), the MCU obtains the number of sub-screens to be activated and the location of each sub-screen.

2) After receiving the information on the number of sub-screens and their locations as selected through the control key, the MCU informs the USB modules to update the EDID information. The USB modules then inform the updated EDID information to the host via the USB hub, indicating the changes in the number of sub-screens and their respective resolutions.

3) The notebook computer host updates its hardware list according to the changes in configuration of sub-screens. In this case, the video signals output on the signal line by the graphic adapter will change accordingly, so as to output the video signals corresponding to the above sub-screens.

4) The USB modules decode the received video data based on the EDID configuration information, so as to output to the display information processing chip three sets of video data (video data A, video data B and video data C) each corresponding to the image of one of the three sub-screens. Herein, the display information processing chip may be a Scalar chip.

4.1) In order to properly display the three sub-screens 2, 3 and 4, as shown in FIG. 8, the three USB modules can set the EDID information based on the preset resolutions as described above, such that the host can detect three USB displays (FIG. 8). If the sub-screen 3 is deactivated, the Scalar chip can directly turn off the downlink port of the USB hub that is connected to the USB module corresponding to the deactivated sub-screen. Thus, the host can detect that one USB display is disconnected. At the same time, the corresponding USB module is turned off.

4.2) If only two sub-screens are to be activated, i.e., if the sub-screen 3 and 4 are combined into a sub-screen 5, the Scalar chip turns off the downlink port of the USB hub corresponding to one of the USB modules and updates the EDID information for the other USB module. Thus, the host hardware list detects that the displays 3 and 4 are disconnected and a display 5 is newly connected.

4.3) If only one sub-screen is to be activated, the Scalar chip turns off the downlink ports of the USB hub corresponding to the sub-screens 3 and 4 and updates the EDID information for the USB module 2. Thus, the host detects that the displays 2, 3 and 4 are disconnected and a display 5 having a resolution of 1920*1080 is newly connected.

The most important information transmitted from the MCU to the Scalar chip is the location of each sub-screen.

The data processing inside the Scalar chip is as follows.

In the above case 4.1), the Scalar chip first calculates the data for the three USB modules (if the resolutions set by the user at the host side are exactly equal to the resolutions preset for the sub-screens, no calculation is needed), combines the sub-screens into a large screen having the same resolution of 1920*1080 as the original display device based on the location information. If a sub-screen is deactivated, all of its pixels will be set to black according to the corresponding preset resolution.

In the above case 4.2), the video port corresponding to the USB module which is turned off will be ignored and only the other two ports will be processed in the same way as described in 4.1).

In the above case 4.3), the Scalar chip only processes the data of the VGA port. Herein, due to the bandwidth restriction of the DVI specification, the sub-screen with the highest resolution among the three sub-screens may use a VGA channel while the other two sub-screens may use a DVI channel or, if combined, a VGA channel as well.

Finally, the Scalar chip outputs the complete image to the liquid crystal screen. Since all the sub-screens share the same background light source, they have the same luminance. However, their respective contrasts and color temperatures can be separately controlled using a related menu which is popped up by operating the control key. In this case, the display control information for the sub-screens further comprises a contrast, a color temperature and/or rotation control information for each of the sub-screens. In this way, the contrast of a sub-screen can be adjusted independently based on the contrast control information for the sub-screen. Likewise, the color temperature and the rotation of a sub-screen can also be independently controlled.

During the process carried out by the Scalar chip, it is also possible to rotate the picture of a particular sub-screen.

In the above process, when the MCU detects the change in the number of activated sub-screen(s) and updates the EDID information, the EDID information will be transmitted to the host. Thus, in the desktop properties of the host, there may be three displays having different resolutions and their respective resolutions can be adjusted separately. FIG. 8 shows a picture displayed in the notebook computer, in which the screen 1 represents the screen of the notebook computer itself, and the sub-screens 2, 3 and 4 represent a plurality of sub-screens in an external display device.

Additionally, as shown in FIG. 7, in the embodiment shown in FIG. 3, the display device according to the present invention may further comprise a frame 111 around the display panel on which the control key can be provided, and a base 112.

To summarize, the above display device according to the present invention has the following characteristics. It is possible to achieve a plurality of independent display screens with one display device. The sub-screens can be combined or separated dynamically, and their respective resolutions, contrasts and color temperatures can be adjusted independently. Each sub-screen can also be independently activated or deactivated. Only one USB line or one DisplayPort line is needed to connect the display device with the host. The number of sub-screens and the location of each sub-screen can be determined by using the control key on the display device, without operation on the host. One or more sub-screens can be rotated separately. The Scalar chip can directly control the on/off of each downlink port of the USB hub. The data for the sub-screen with the highest resolution can be transmitted over a VGA channel. The EDID information can be dynamically updated. In this way, the cost can be reduced. One display device can provide the functionality of several conventional display devices, such that the operation efficiency can be improved and the fatigue and inconvenience caused by the user frequently turning his/her head when using several display devices can be eliminated. Also, the desktop space can be saved and the desktop tidiness can be improved due to the decreased number of cables. The display device of the present invention can reduce power consumption and support plug-and-play operation. Since all the interfaces and drivers conform to industrial standards, the risk of incompatibility can be greatly reduced. The present invention only occupies a USB port or a DisplayPort interface, rather than the video port. This is convenient since almost every host is equipped with a number of USB ports. If the built-in USB hub has more than three downlink ports, the remaining ports can be used by other USB devices such as mouse, keyboard, flash disk, built-in camera of the display device. In this way, a USB line can provide a variety of functions.

However, when the above video interface is a video interface which does not support multi-channel signal transmission (such as DVI interface or VGA interface), it is required to connect the DVI interface of the host with the DVI interface of the display device using one line, and connect the VGA interface of the host with the VGA interface of the display device using another line. In such a case where there are too many connection lines, it is also possible to construct all the lines connected between the host video interfaces and the display video interfaces into a multi-Y-shaped signal line. For example, two connection lines can be constructed into a double-Y-shaped signal line. Each of the two branches of a Y-shaped line can be a lead of a connection line.

Figure 9:
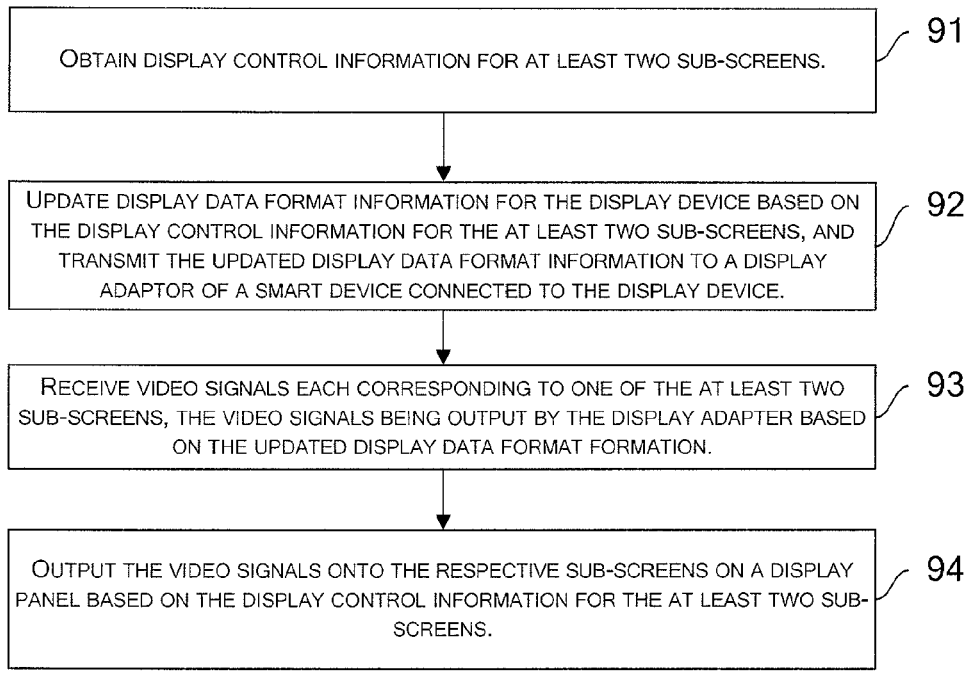
FIG. 9 is a flowchart illustrating a display method for a display device according to the present invention.

As shown in FIG. 9, according to an embodiment of the present invention, a display method for a display device is provided, which comprises the following steps.

At step 91, the display control information for at least two sub-screens is obtained. For example, the display control information for at least two sub-screens as selected by the user from split-screen options through a control key on the display device can be obtained.

At step 92, the display data format information for the display device is updated based on the display control information for the at least two sub-screens, and the updated display data format information is transmitted to a display adaptor of an intelligent device connected to the display device.

At step 93, the video signals each corresponding to one of the at least two sub-screens are received. The video signals are output by the display adapter based on the updated display data format formation.

At step 94, the video signals each corresponding to one of the at least two sub-screens are output onto the respective sub-screens on a display panel based on the display control information for the at least two sub-screens.

Herein, the display control information for the sub-screens comprises the number of sub-screens and information on display location of each of the sub-screens on the display panel.

The above step 94 may comprise: calculating, based on the number of the at least two sub-screens, the resolution of a sub-screen on which a video signal is to be displayed and outputting the video signal onto the sub-screen on the display panel of the display device based on the resolution of the sub-screen and the information on the display location of the sub-screen on the display panel.

The process described above with reference to FIG. 9 is also applicable to the embodiment of the method according to the present invention, which has the same technical effects as those of the above embodiment of the display device.

While the present invention has been described with reference to the above preferred embodiments, a number of variants and modifications can be made by those skilled in the art without departing from the scope of the present invention.

What is claimed is:

1. A display device having a display panel, comprising:
   a Micro Control Unit (MCU) for obtaining, from a user input, display control information for at least two sub-screens, updating display data format information for the display device, comprising respective resolutions of respective sub-screens, based on the display control information, and transmitting the updated display data format information to a display adaptor of an intelligent device connected to the display device, wherein the display control information indicates the number of sub-screens to be activated and the location of each sub-screen;
   a video interface supporting multi-channel signal transmission, for receiving video signals each corresponding to one of the at least two sub-screens, the video signals being output by the display adapter based on the updated display data format formation; and
   a display information processing chip for obtaining the video signals and the display control information for the at least two sub-screens received by the MCU, and outputting the video signals onto the respective sub-screens on the display panel based on the display control information for the at least two sub-screens.

2. The display device according to claim 1, wherein the video interface supporting multi-channel signal transmission is a digital display interface, DisplayPort, which is directly connected to the display adapter.

3. The display device according to claim 1, wherein the video interface supporting multi-channel signal transmission is a USB interface comprising a USB hub and at least two USB modules, wherein
   the USB hub is connected to the display adapter, the at least two USB modules are each connected to the USB hub, and each of the at least two USB modules corresponds to one of the at least two sub-screens; and
   the at least two USB modules are each connected to the MCU and to the display information processing chip and configured for transmitting the display data format information updated by the MCU to the display adapter via the USB hub, receiving the video signals output by the display adapter based on the updated display data format information and outputting the video signals to the display information processing chip.

4. The display device according to claim 3, wherein each of the at least two USB modules is configured for:
   turning off a connection port to the display information processing chip based on the display data format information updated by the MCU; or
   transmitting the updated display data format information to the USB hub which turns off its connection port to the USB module based on the display data format information updated by the MCU.

5. The display device according to claim 4, wherein each of the USB modules comprises:
   a USB decoder for decoding a video signal received from the display adapter into a signal in DVI, VGA or HDMI format;
   a flash memory for storing the video signal decoded by the USB decoder; and
   a Double Data Rate (DDR) memory for supporting the decoding by the USB decoder.

6. The display device according to claim 3, wherein each of the USB modules comprises:
   a USB decoder for decoding a video signal received from the display adapter into a signal in DVI, VGA or HDMI format;
   a flash memory for storing the video signal decoded by the USB decoder; and
   a Double Data Rate (DDR) memory for supporting the decoding by the USB decoder.

7. The display device according to claim 1, further comprising:
   a control key for providing split-screen options, obtaining display control information for the at least two sub-screens as selected by the user from the split-screen options, and transmitting the display control information for the at least two sub-screens to the MCU.

8. The display device according to claim 1, wherein the display control information for the sub-screens comprises the number of sub-screens and information on display location of each of the sub-screens on the display panel.

9. The display device according to claim 8, wherein the display control information for the sub-screens further comprises a contrast, a color temperature and/or rotation control information for each of the sub-screens.

10. A display method for a display device, comprising:
    obtaining, from a user input, display control information for at least two sub-screens, wherein the display control information indicates the number of sub-screens to be activated and the location of each sub-screen;
    updating display data format information for the display device, comprising respective resolutions of respective sub-screens, based on the display control information for the at least two sub-screens, and transmitting the updated display data format information to a display adaptor of an intelligent device connected to the display device;
    receiving video signals each corresponding to one of the at least two sub-screens, the video signals being output by the display adapter based on the updated display data format formation; and
    outputting the video signals onto the respective sub-screens on a display panel based on the display control information for the at least two sub-screens.

11. The display method according to claim 10, wherein the display control information for the sub-screens comprises the number of sub-screens and information on display location of each of the sub-screens on the display panel.

12. The display method according to claim 11, wherein the step of outputting the video signals onto the respective sub-screens on a display panel based on the display control information for the at least two sub-screens comprises:
- calculating, based on the number of the at least two sub-screens, the resolution of a sub-screen on which a video signal is to be displayed and outputting the video signal onto the sub-screen on the display panel of the display device based on the resolution of the sub-screen and the information on the display location of the sub-screen on the display panel.

* * * * *